(12) United States Patent
Long et al.

(10) Patent No.: US 7,185,005 B1
(45) Date of Patent: Feb. 27, 2007

(54) NESTED TRANSACTIONS IN A FILE SYSTEM

(75) Inventors: David Long, Walnut Creek, CA (US); David B. Pitfield, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 645 days.

(21) Appl. No.: 09/853,823

(22) Filed: May 11, 2001

Related U.S. Application Data (60) Provisional application No. 60/204,196, filed on May 12, 2000.

(51) Int. Cl.
G06F 17/30 (2006.01)

(52) U.S. Cl. .................. 707/4; 707/10; 707/9; 718/101

(58) Field of Classification Search ................ 718/100, 718/102, 101; 707/1–10; 709/200–203
See application file for complete search history.

(56) References Cited

U.S. PATENT DOCUMENTS

| | | | | |
|---|---|---|---|---|
| 5,222,242 A | 6/1993 | Choi et al. | .................. | 395/800 |
| 5,313,629 A | 5/1994 | Abraham et al. | ........... | 395/600 |
| 5,327,556 A | 7/1994 | Mohan et al. | .............. | 395/600 |
| 5,388,257 A | 2/1995 | Bauer | .......................... | 395/600 |
| 5,457,793 A | 10/1995 | Elko et al. | .................. | 395/600 |
| 5,701,485 A | 12/1997 | Guillen et al. | | |
| 5,778,179 A * | 7/1998 | Kanai et al. | ................. | 709/203 |
| 5,799,305 A | 8/1998 | Bortvedt et al. | ............... | 707/10 |
| 5,864,870 A | 1/1999 | Guck | .......................... | 707/104 |
| 5,870,757 A | 2/1999 | Fuller | ........................... | 707/201 |
| 5,873,093 A | 2/1999 | Williamson et al. | ......... | 707/103 |
| 5,878,411 A | 3/1999 | Burroughs et al. | ............. | 707/4 |
| 5,913,063 A | 6/1999 | McGurrin et al. | | |
| 5,937,406 A | 8/1999 | Balabine et al. | ............. | 707/100 |
| 5,956,506 A * | 9/1999 | Cobb et al. | .................. | 718/101 |
| 6,014,733 A | 1/2000 | Bennett | | |
| 6,021,414 A * | 2/2000 | Fuller | .......................... | 707/202 |
| 6,044,224 A | 3/2000 | Radia et al. | | |
| 6,078,926 A | 6/2000 | Jensen et al. | | |
| 6,094,649 A | 7/2000 | Bowen et al. | | |
| 6,119,151 A | 9/2000 | Cantrell et al. | ............. | 709/216 |
| 6,128,771 A | 10/2000 | Tock et al. | | |

(Continued)

OTHER PUBLICATIONS

Dourish et al., "Extending Document Management Systems with User-Specific Active Properties." ACM Transactions on Information Systems, vol. 18, Issue 2, pp. 140-170 (Apr. 2000).*

(Continued)

*Primary Examiner*—Lewis A. Bullock, Jr.
(74) *Attorney, Agent, or Firm*—Hickman Palermo Truong & Becker LLP (57) ABSTRACT

Techniques are provided for performing operations in an electronic file system as nested transactions. According to one aspect of the invention, a command to perform one or more file system operations is received. In response to the command, a plurality of operations, including the one or more file system operations, are performed. Performing the plurality of operations includes: (1) performing a first subset of the plurality of operations as part of a first transaction; and (2) performing a second subset of the plurality of operations as part of a second transaction that is nested in the first transaction.

20 Claims, 4 Drawing Sheets

U.S. PATENT DOCUMENTS

| | | | |
|---|---|---|---|
| 6,173,292 B1 | 1/2001 | Barber et al. ............... 707/200 |
| 6,209,000 B1 | 3/2001 | Klein et al. ................. 707/203 |
| 6,216,212 B1 | 4/2001 | Challenger et al. ......... 711/163 |
| 6,298,478 B1 * | 10/2001 | Nally et al. ................. 717/170 |
| 6,324,581 B1 | 11/2001 | Xu et al. .................... 709/229 |
| 6,336,216 B1 | 1/2002 | Curtis et al. |
| 6,345,382 B1 | 2/2002 | Hughes ........................ 717/1 |
| 6,385,618 B1 | 5/2002 | Ng et al. |
| 6,418,451 B1 | 7/2002 | Maimone |
| 6,457,017 B2 | 9/2002 | Watkins et al. ......... 707/103 R |
| 6,457,065 B1 * | 9/2002 | Rich et al. .................. 719/328 |
| 6,513,056 B1 | 1/2003 | Copeland et al. ........... 709/101 |
| 6,523,171 B1 | 2/2003 | Dupuy et al. |
| 6,549,916 B1 | 4/2003 | Sedlar ........................ 707/200 |
| 6,567,819 B1 | 5/2003 | Cheng et al. ............... 707/101 |
| 6,594,823 B1 | 7/2003 | Corbin et al. .............. 717/143 |
| 6,601,071 B1 | 7/2003 | Bowker et al. |
| 6,625,602 B1 * | 9/2003 | Meredith et al. ........... 707/202 |
| 6,684,222 B1 | 1/2004 | Cornelius et al. |
| 6,697,846 B1 | 2/2004 | Soltis ........................ 709/217 |
| 6,721,727 B2 | 4/2004 | Chau et al. |
| 6,766,330 B1 | 7/2004 | Chen et al. |
| 6,769,124 B1 | 7/2004 | Schoening et al. |
| 6,810,429 B1 | 10/2004 | Walsh et al. |
| 6,901,588 B1 | 5/2005 | Krapf et al. ................ 717/164 |
| 6,922,708 B1 * | 7/2005 | Sedlar ........................ 707/202 |
| 6,970,975 B2 | 11/2005 | Frank |
| 2001/0047385 A1 | 11/2001 | Tuatini ....................... 709/203 |
| 2002/0035645 A1 | 3/2002 | Tuatini ....................... 709/310 |
| 2002/0073091 A1 | 6/2002 | Jain et al. ................... 707/100 |
| 2002/0091702 A1 | 7/2002 | Mullins ...................... 707/100 |
| 2003/0195865 A1 | 10/2003 | Long et al. |
| 2003/0195866 A1 | 10/2003 | Long et al. |
| 2003/0200197 A1 | 10/2003 | Long et al. |

OTHER PUBLICATIONS

"The Java™ Virtual Machine Specification", retrieved Feb. 7, 2005 from the Internet, URL: http://java.sun.com/docs/booksvmspec/html/ClassFile.doc.html.

Balter, A., "Alison Balter's Mastering Access 97 Development" *Sams Publishing* (1997) Chapter 22, pp. 1-4.

"Mapping A Relational Database to a Hierarchical File System" *IBM* (1995) 3 pages.

Lowis, Martin von, "Virtual Method Tables in Python" [online][retrieved at]http://foretec.com/python/workshops/1998-11/proceedings/papers/lowis/lowis.html>(1998) 11 pages.

Oracle® Internet File System™ Developer's Guide Release 1.1, Part No. A75172-04 (2000) 90 pages.

* cited by examiner

NESTED TRANSACTIONS IN A FILE SYSTEM

PRIORITY CLAIM AND CROSS-REFERENCE TO RELATED APPLICATIONS

This application is related to and claims domestic priority from prior U.S. Provisional Patent Application Ser. No. 60/204,196 filed on May 12, 2000 entitled "Techniques and Features of an Internet File System", by David Long, the entire disclosure of which is hereby incorporated by reference as if fully set forth herein.

FIELD OF THE INVENTION

The present invention relates to electronic file systems, and in particular to electronic file systems capable of nesting transactions within transactions.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional operating systems, for example, provide file systems that use hierarchy-based organization principles. Specifically, a typical operating system file system ("OS file system") has folders arranged in a hierarchy, and documents stored in the folders. Ideally, the hierarchical relationships between the folders reflect some intuitive relationship between the meanings that have been assigned to the folders. Similarly, it is ideal for each document to be stored in a folder based on some intuitive relationship between the contents of the document and the meaning assigned to the folder in which the document is stored.

Recently, techniques have been developed to use a relational database to store files that have traditionally been stored in OS file systems. By storing the files in a relational database, the files may be accessed by issuing database commands to a database server. In many circumstances, retrieving and manipulating files by issuing database commands can be much more efficient than by issuing file system commands due to the enhanced functionality of database servers. One system in which a relational database is used as the back end of a file system is described in U.S. patent application Ser. No. 09/571,508, entitled "Multi-Model Access to Data", filed on May 15, 2000 by Eric Sedlar, the entire contents of which are incorporated herein by this reference. In the Sedlar system, the files are accessible both (1) by making calls to conventional file system APIs, and (2) by issuing queries to the database server.

A transaction is an "all or nothing" unit of work. Changes made by operations that belong to a transaction are not made permanent until all changes in the transaction are successfully made and the transaction commits. If any operation within a transaction fails, then all changes made by the transaction are undone. The removal of changes made by a transaction is referred to as a "rollback" operation.

When an OS file system is implemented using a relational database system, a series of file system operations may be performed as a transaction within the database system. Techniques for performing file system operations as a transaction are described in U.S. patent application Ser. No. 09/571,496, which issued as U.S. Pat. No. 6,922,708 on Jul. 26, 2005, entitled "File System that Supports Transactions", filed on May 15, 2000, by Eric Sedlar, the entire contents of which are incorporated herein by this reference.

The ability to perform file system operations within an all-or-nothing transaction is extremely helpful in certain situations. For example, assume that a certain program requires ten files to run. Assume further that all of those ten files must reside in the same folder for the program to run correctly, that the files currently reside in a first folder and that a user wants to move the files to a second folder. If all ten of the files cannot be moved to the second folder, then it would be desirable for none of the ten files to be moved so that the program can still be run from the first folder.

Unfortunately, there are many situations in which the all-or-nothing nature of transactions is too simplistic for the behavior that is desired of the file system. For example, assume that the file system has been configured to send an email to the owner of a file and to the system administrator in response to the file being copied. A user may want to be able to copy the files in a folder, and have the system operate according to the following rules:

RULE 1: If any folder contains other folders, and the entire contents of the folder are being copied, then the entire contents of the other folders should be copied.

RULE 2: If all of the documents in a folder cannot be copied, then none of the documents should be copied.

RULE 3: If all of the documents in a folder can be copied, then they should be copied regardless of whether the contents in any other folders can be copied.

RULE 4: If all of the documents in a folder can be copied, then they should be copied regardless of whether any email is sent.

RULE 5: For any given file, if email cannot be sent to both the owner and the system administrator, then no email should be sent.

To accomplish rules 1, 2 and 5, the user may cause the file copy operations and the email transmission operations to be performed as part of a single transaction. However, this could result in violation of rules 3 and 4. For example, if the sending of email is performed as part of the same transaction as the copying of a document, then the failure of an email will necessarily cause a failure of the copy operation.

Based on the foregoing, it is clearly desirable to provide techniques that allow the use of more sophisticated policies with respect to the transactional relationships between file system operations, and operations triggered by file system operations.

SUMMARY OF THE INVENTION

Techniques are provided for performing operations in an electronic file system as nested transactions. According to one aspect of the invention, a command to perform one or more file system operations is received. In response to the command, a plurality of operations, including the one or more file system operations, are performed. Performing the plurality of operations includes: (1) performing a first subset of the plurality of operations as part of a first transaction; and (2) performing a second subset of the plurality of operations as part of a second transaction that is nested in the first transaction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for providing nested transactions within a file system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architectural Overview

Figure 1:
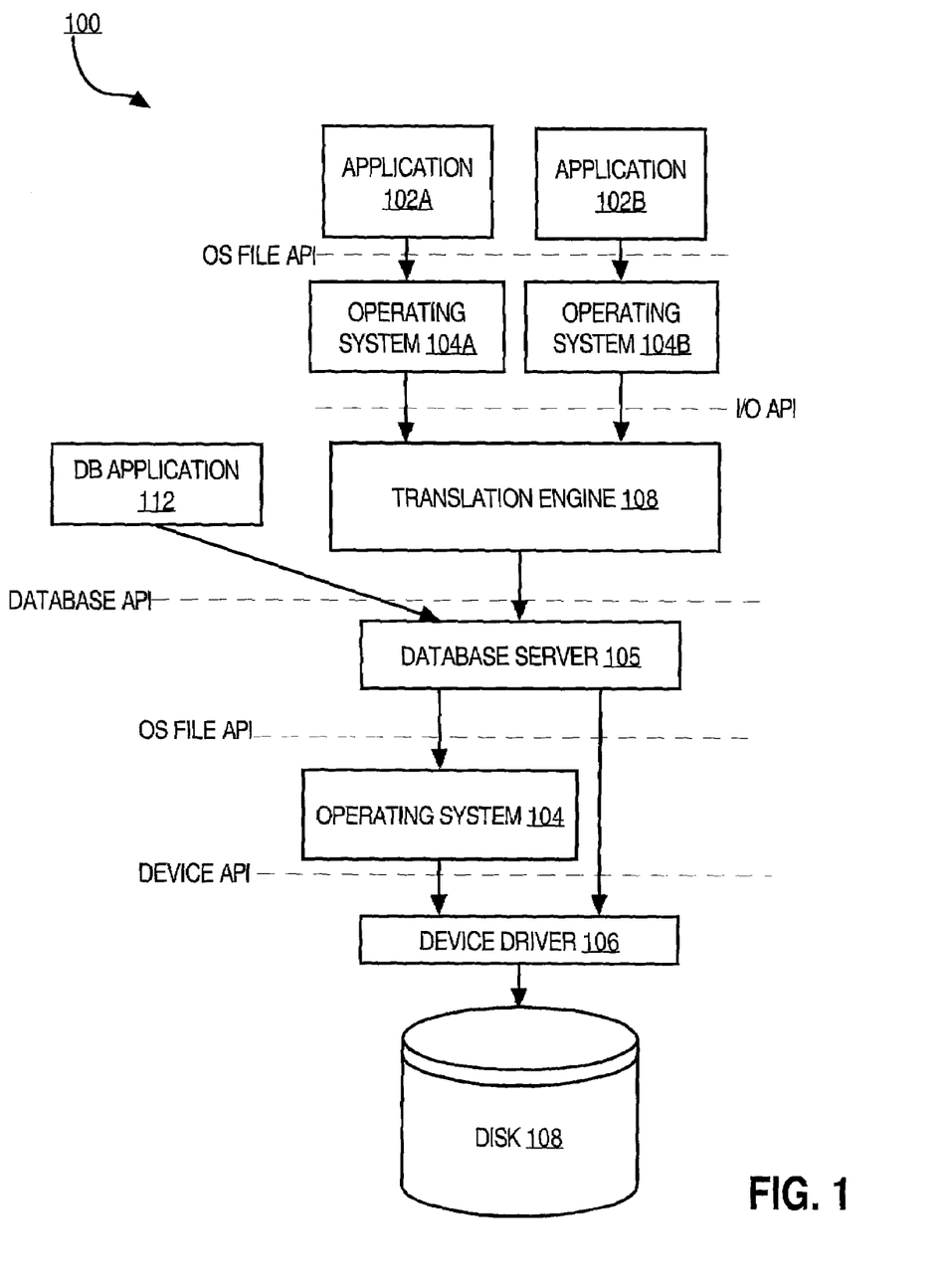
FIG. 1 is a block diagram of a system for managing files using a database system according to an embodiment of the invention.

FIG. 1 is a block diagram that illustrates the architecture of a system 100 implemented according to an embodiment of the invention. System 100 includes a database server 105 that provides a database API through which a database application 112 can access data managed by database server 105. From the perspective of all entities that access data managed by database server 105 through the database API, the data managed by database server 105 is stored in relational tables that can be queried using the database language supported by database server 105 (e.g. SQL). Transparent to those entities, database server 105 stores the data to disk 108. According to one embodiment, database server 105 implements disk management logic that allows it to store the data directly to disk and thus avoid the overhead associated with the OS file system of operating system 104. Thus, database server 105 may cause the data to be stored to disk either by (1) by making calls to the OS file system provided by operating system 104, or (2) storing the data directly to disk, thus circumventing operating system 104.

System 100 provides a translation engine 108 that translates I/O commands received from operating systems 104a and 104b into database commands that the translation engine 108 issues to database server 105. When the I/O commands call for the storage of data, translation engine 108 issues database commands to database server 105 to cause the data to be stored in relational tables managed by database server 105. When the I/O commands call for the retrieval of data, translation engine 108 issues database commands to database server 105 to retrieve data from relational tables managed by database server. Translation engine 108 then provides the data thus retrieved to the operating system that issued the I/O commands.

The Translation Engine

Figure 2:
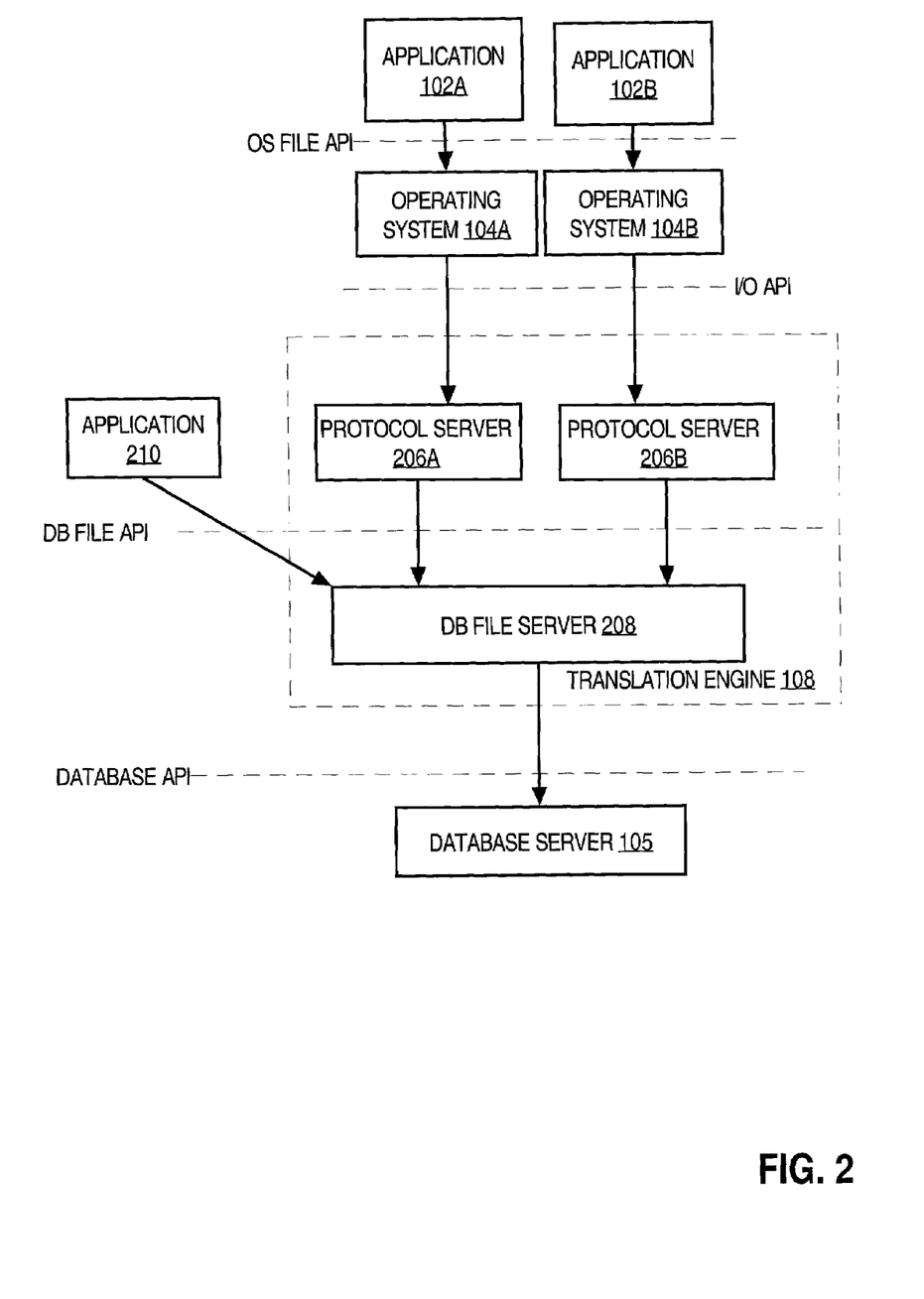
FIG. 2 is a block diagram that illustrates the translation engine of FIG. 1 in greater detail.

According to one embodiment of the invention, translation engine 108 is designed in two layers. Those layers are illustrated in FIG. 2. Referring to FIG. 2, translation engine 108 includes a protocol server layer, and a DB file server 208 layer. DB file server 208 allows applications to access data stored in the database managed by database server 204 through an alternative API, referred to herein as the DB file API. The DB file API combines aspects of both an OS file API and the database API. Specifically, the DB file API supports file operations similar to those supported by conventional OS file APIs.

However, unlike OS file APIs, the DB file API incorporates the database API concept of transactions. That is, the DB file API allows applications to specify that a set of file operations are to be performed as an atomic unit.

DB File Server

The DB file server 208 is responsible for translating DB file API commands to database commands. The DB file API commands received by DB file server 208 may come from the protocol server layer of translation engine 108, or directly from applications (e.g. application 210) specifically designed to perform file operations by issuing calls through the DB file API.

According to one embodiment, DB file server 208 is object oriented. Thus, the routines supplied by DB file server 208 are invoked by instantiating an object and calling methods associated with the object. In one implementation, the DB file server 208 defines a "transaction" object class that includes the following methods: insert, save, update, delete, commit and roll-back. The DB file API provides an interface that allows external entities to instantiate and use the transaction object class.

Specifically, when an external entity (e.g. application 210 or a protocol server) makes a call to DB file server 208 to instantiate a transaction object, DB file server 208 sends a database command to database server 204 to begin a new transaction. The external entity then invokes the methods of the transaction object. The invocation of a method results in a call to DB file server 208. DB file server 208 responds to the call by issuing corresponding database commands to database server 204. All database operations that are performed in response to the invocation of methods of a given transaction object are performed as part of the database transaction associated with the given transaction object.

Significantly, the methods invoked on a single transaction object may involve multiple file operations. For example, application 210 may interact with DB file server 208 as follows: Application 210 instantiates a transaction object TXO1 by making a call through the DB file API. In response, DB file server 208 issues a database command to start a transaction TX1 within database server 204. Application 210 invokes the update method of TXO1 to update a file F1 stored in the database managed by database server 204. In response, DB file server 208 issues a database command to database server 204 to cause the requested update to be performed as part of transaction TX1. Application 210 invokes the update method of TXO1 to update a second file F2 stored in the database managed by database server 204. In response, DB file server 208 issues a database command to database server 204 to cause the requested update to be performed as part of transaction TX1. Application 210 then invokes the commit method of TXO1. In response, DB file server 208 issues a database command to database server 204 to cause TX1 to be committed. If the update to file F2 had failed, then the roll-back method of TXO1 is invoked and all changes made by TX1, including the update to file F1, are rolled back.

While techniques have been described herein with reference to a DB file server that uses transaction objects, other implementations are possible. For example, within the DB file server, objects may be used to represent files rather than transactions. In such an implementation, file operations may be performed by invoking the methods of the file objects, and passing thereto data that identifies the transaction in which the operations are to be executed. Thus, the present invention is not limited to a DB file server that implements any particular set of object classes.

For the purpose of explanation, the embodiment illustrated in FIG. 2 shows DB file server 208 as a process executing outside database server 204 that communicates with database server 204 through the database API. However, according to an alternative embodiment, the functionality of DB file server 208 is built into database server 204. By building DB file server 208 into database server 204, the amount of inter-process communication generated during the use of the DB file system is reduced. The database server produced by incorporating DB file server 208 into database server 204 would therefore provide two alternative APIs for accessing data managed by the database server 204: the DB file API and the database API (SQL).

Protocol Servers

The protocol server layer of translation engine 108 is responsible for translating between specific protocols and DB file API commands. For example, protocol server 206a translates I/O commands received from operating system 104a to DB file API commands that it sends to DB file server 208. Protocol server 206a also translates DB file API commands received from DB file server 208 to I/O commands that it sends to operating system 104a.

In practice, there is not a one-to-one correspondence between protocols and operating systems. Rather, many operating systems support more than one protocol, and many protocols are supported by more then one operating system. For example, a single operating system may provide native support for one or more of network file protocols (SMB, FTP, NFS), e-mail protocols (SMTP, IMAP4), and web protocols (HTTP). Further, there is often an overlap between the sets of protocols that different operating systems support. However, for the purpose of illustration, a simplified environment is shown in which operating system 104A supports one protocol, and operating system 104b supports a different protocol.

The I/O API

As mentioned above, protocol servers are used to translate I/O commands to DB file commands. The interface between the protocol servers and the OS file systems with which they communicate is generically labeled I/O API. However, the specific I/O API provided by a protocol server depends on both (1) the entity with which the protocol server communicates, and (2) how the protocol server is to appear to that entity. For example, operating system 104a may be Microsoft Windows NT, and protocol server 206a may be designed to appear as a device driver to Microsoft Windows NT. Under those conditions, the I/O API presented by protocol server 206a to operating system 104a would be a type of device interface understood by Windows NT. Windows NT would communicate with protocol server 206a as it would any storage device. The fact that files stored to and retrieved from protocol server 206a are actually stored to and retrieved from a database maintained by database server 204 is completely transparent to Windows NT.

While some protocol servers used by translation engine 108 may present device driver interfaces to their respective operating systems, other protocol servers may appear as other types of entities. For example, operating system 104a may be the Microsoft Windows NT operating system and protocol server 206a presents itself as a device driver, while operating system 104b is the Microsoft Windows 95 operating system and protocol server 206b presents itself as a System Message Block (SMB) server. In the latter case, protocol server 206b would typically be executing on a different machine than the operating system 104b, and the communication between the operating system 104b and protocol server 206b would occur over a network connection.

In the examples given above, the source of the I/O commands handled by the protocol servers are OS file systems. However, translation engine 108 is not limited to use with OS file system commands. Rather, a protocol server may be provided to translate between the DB file commands and any type of I/O protocol. Beyond the I/O protocols used by OS file systems, other protocols for which protocol servers may be provided include, for example, the File Transfer Protocol (FTP) and the protocols used by electronic mail systems (POP3 or IMAP4).

Just as the interface provided by the protocol servers that work with OS file systems is dictated by the specific OS, the interface provided by the protocol servers that work with non-OS file systems will vary based on the entities that will be issuing the I/O commands. For example, a protocol server configured receive I/O commands according to the FTP protocol would provide the API of an FTP server. Similarly, protocol servers configured to receive I/O commands according to the HTTP protocol, the POP3 protocol, and the IMAP4 protocol, would respectively provide the APIs of an HTTP server, a POP3 server, and an IMAP4 server.

Similar to OS file systems, each non-OS file protocol expects certain attributes to be maintained for its files. For example, while most OS file systems store data to indicate the last modified date of a file, electronic mail systems store data for each e-mail message to indicate whether the e-mail message has been read. The protocol server for each specific protocol implements the logic required to ensure that the semantics its protocol are emulated in the database file system.

Nested Transactions

A nested transaction is a transaction that is performed within another transaction. The transaction in which a nested transaction is nested is referred to as its "outer" transaction. When a nested transaction fails, all changes made within the nested transaction are rolled back. However, the failure of the nested transaction does not necessarily cause its outer transaction to fail. Whether the outer transaction fails in response to the failure of a nested transaction is determined by the logic of the outer transaction.

Nested Transactions within a File System

According to one embodiment of the invention, mechanisms are provided to allow file system operations, and operations triggered by file system operations, to be performed as nested transactions. For example, consider the example previously given in which a file system has been configured to send an email to the owner of a file and to the system administrator in response to the file being copied. A user may want to be able to copy the files in a folder, and have the system operate according to the following rules:

RULE 1: If any folder contains other folders, and the entire contents of the folder are being copied, then the entire contents of the other folders should be copied.

RULE 2: If all of the documents in a folder cannot be copied, then none of the documents should be copied.

RULE 3: If all of the documents in a folder can be copied, then they should be copied regardless of whether the contents in any other folders can be copied.

RULE 4: If all of the documents in a folder can be copied, then they should be copied regardless of whether any email is sent.

RULE 5: For any given file, if email cannot be sent to both the owner and the system administrator, then no email should be sent.

The desired file system behavior may be achieved using nested transactions by performing the file copy operations for all contents within each folder as a transaction, the copy operations for the contents of embedded folders as nested transactions, and the email transmission operations for each copied file as a separate nested transaction. The operations associated with copying the contents of a folder with three files may be diagrammed as follows:

Start "Copy Files" transaction
Copy First File
Start Nested Transaction 1
Send email to owner of First File
Send email to the administrator
End Nested Transaction 1
Copy Second File
Start Nested Transaction 2
Send email to owner of Second File
Send email to the administrator
End Nested Transaction 2
Copy Third File
Start Nested Transaction 3
Send email to owner of Third File
Send email to the administrator
End Nested Transaction 3
End "Copy File" Transaction Because, for each file, the email transmissions are sent as part of a nested transaction, email will only be sent if both email messages can be sent. Because the email transmission operations are performed as nested transactions, and not merely as operations within the file copy transaction, the file copy operations may succeed even if one or more of the email transmission operations fail.

Also, because the email operations are performed as nested transactions within the file copy transaction, if any file copy operation fails, the file copy transaction fails and all of the email transmission operations will be rolled back. Thus, users will not be notified that a file has been copied if the copy transaction does not commit.

Figure 3:
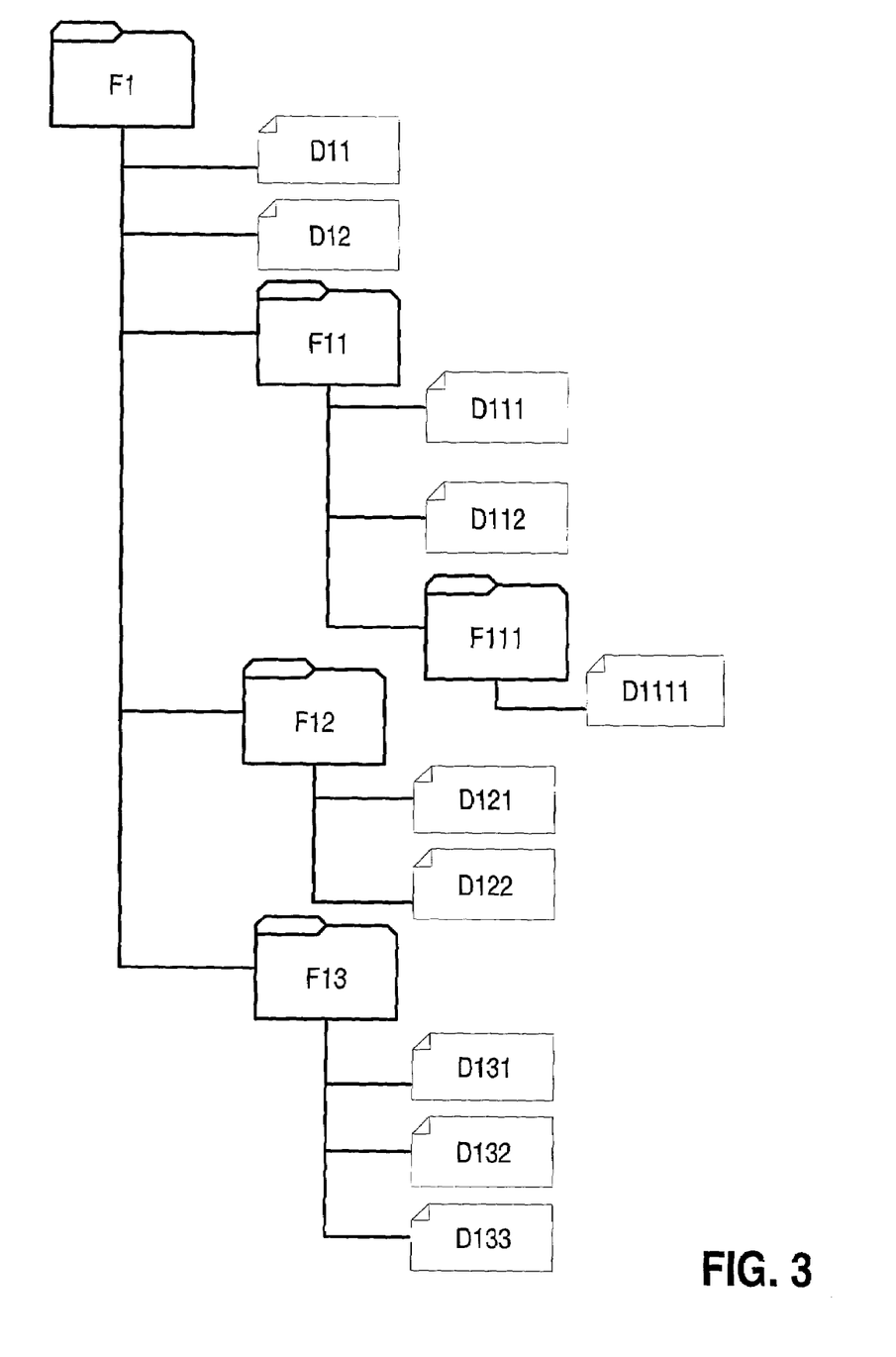
FIG. 3 is a block diagram illustrating an exemplary hierarchical file organization.

For a more sophisticated example, assume that translation engine 108 and database server 105 are being used to maintain files that are currently organized as illustrated in FIG. 3. Referring to FIG. 3, a first folder F1 contains two documents D11 and D12 and three other folders F11, F12 and F13. Folder F11 contains two documents D111 and D112 and one folder F111. Folder F111 contains one document D1111. Folder F12 contains two documents D121 and D122, and folder F13 contains three documents D131, D132 and D133.

Assume that the file system has been configured to implement the five rules specified above. Assume further that DB file server 208 receives a command to copy the contents of folder F1 in FIG. 3 to a particular destination. The operations involved in that operation are performed in a series of transactions according to the following logic:

Start transaction 1
Copy Folder F1
Copy Document D11
Start transaction 2
send email to owner of D11
send email to the administrator
End transaction 2
Copy Document D12
Start transaction 3
send email to owner of D12
send email to the administrator
End transaction 3
/* To Copy Contents of Folder F11 */
Start transaction 4
Copy Folder F11
Copy Document D111
  Start transaction 5
  send email to owner of D111
  send email to the administrator
  End transaction 5
Copy Document D112
  Start transaction 6
  send email to owner of D112
  send email to the administrator
  End transaction 6
/* To Copy Contents of Folder F111 */
Start transaction 7
Copy Folder F111
Copy Document D1111
  Start transaction 8
  send email to owner of D1111
  send email to the administrator
  End transaction 8
End transaction 7
End transaction 4
/* To Copy Contents of Folder F12 */
Start transaction 9
Copy Folder F12
Copy Document D121
  Start transaction 10
  send email to owner of D121
  send email to the administrator
  End transaction 10
Copy Document D122
  Start transaction 11
  send email to owner of D122
  send email to the administrator
  End transaction 11
End transaction 9
/* To Copy Contents of Folder F13 */
Start transaction 12
Copy Folder F13
Copy Document D131
  Start transaction 13
  send email to owner of D131
  send email to the administrator
  End transaction 13

Copy Document D132
  Start transaction 14
    send email to owner of D132
    send email to the administrator
  End transaction 14
Copy Document D133
  Start transaction 15
    send email to owner of D133
    send email to the administrator
  End transaction 15
End transaction 12
End transaction 1

Interactions with Database Server

According to one embodiment of the invention, the nested transaction behavior described above is achieved by sending database commands to database server 105 according to the following rules:

(1) When starting the outermost transaction, send a "begin transaction" command to the database server.

(2) When starting any nested transaction, send a "savepoint" command to the database server.

(3) If an operation in a nested transaction fails, roll back to the savepoint associated with that nested transaction.

(4) If an operation in the outermost transaction fails, roll back the entire transaction.

(5) If no operation in the outermost transaction fails, send a "commit transaction" command to the database server.

According to one embodiment, DB file server 208 maintains a transaction list for each outermost transaction. Every time any transaction is started, an entry associated with the transaction is added to the tail of the transaction list. Each entry identifies the name given to the savepoint that was established when the transaction for the entry was started.

When a nested transaction fails, its entry (which will be on the tail of the transaction list) is inspected to determine the name of the savepoint to roll back to. After rollback, the entry is removed from the tail of the transaction list. If a nested transaction completes successfully, then the entry is removed from the tail of the list and no rollback is performed.

By maintaining a transaction list in this manner, the entry on the tail of the transaction list will always identify the savepoint that must be rolled back to in response to an error.

Operational Example

Assume that DB file server 208 receives a request to copy folder F1 of FIG. 3. In response to this request, DB file server 208 creates a transaction list and adds "TX1" to the transaction list. At this point, the transaction list contains: TX1. The DB file server 208 also sends database server 105 a "begin transaction TX1" command.

After sending the begin transaction TX1 command, the DB file server 208 sends database server 105 the command to copy Folder F1, and a command to copy Document D11. If a failure occurs during either of these operations, then the DB file server 208 sends a database command to database server 105 to roll back to the savepoint associated with the last transaction on the transaction list. In the present example, TX1 is the only entry in the list. Therefore, in response to a failure, DB file server 208 would send database server 105 a command to "roll back" the entire TX1 transaction.

Nested Transactions TX2, TX3 and TX4

If the copying of Document D11 is successful, then DB file server 208 adds an entry for another transaction TX2 to the tail of the transaction list, and sends database server 105 a savepoint command for transaction TX2. At this point, the transaction list contains: TX1, TX2.

The DB file server 208 then sends commands to database server 105 to send email to the owner of D11 and to send email to the administrator. If a failure occurs during the transmission of either message, then the DB file server 208 sends a database command to database server 105 to roll back to the savepoint associated with the last transaction on the transaction list. In the present example, TX2 is the last entry in the list. Therefore, in response to a failure, DB file server 208 would send database server 105 a command to "roll back" to the savepoint associated with TX2.

After rolling back, DB file server 108 removes the entry at the tail of the transaction list. In the present case, DB file server 108 removes the entry for TX2. If the transmission of the email messages is successful, then no rollback is performed, and the entry for TX2 is removed from the tail of the transaction list. At this point, the transaction list contains: TX1.

The DB file server 208 then sends database server 105 the command to copy Document D12. If a failure occurs, then the DB file server 208 sends a database command to database server 105 to roll back to the savepoint associated with the last transaction on the transaction list. In the present example, TX1 is the only entry in the list. Therefore, in response to a failure, DB file server 208 would send database server 105 a command to "roll back" the entire TX1 transaction.

If the copying of Document D12 is successful, then DB file server 208 adds an entry for another transaction TX3 to the tail of the transaction list, and sends database server 105 a savepoint command for transaction TX3. At this point, the transaction list contains: TX1, TX3.

The DB file server 208 then sends commands to database server 105 to send email to the owner of D12 and to send email to the administrator. If a failure occurs during the transmission of either message, then the DB file server 208 sends a database command to database server 105 to roll back to the savepoint associated with the last transaction on the transaction list. In the present example, TX3 is the last entry in the list. Therefore, in response to a failure, DB file server 208 would send database server 105 a command to "roll back" to the savepoint associated with TX3.

After rolling back, DB file server 108 removes the entry at the tail of the transaction list. In the present case, DB file server 108 removes the entry for TX3. If the transmission of the email messages is successful, then no rollback is performed, and the entry for TX3 is removed from the tail of the transaction list. At this point, the transaction list contains: TX1.

DB file server 208 adds an entry for another transaction TX4 to the tail of the transaction list, and sends database server 105 a savepoint command for TX4. At this point, the transaction list contains: TX1, TX4.

The DB file server 208 then sends database server 105 commands to copy Folder F11 and Document D111. If a failure occurs during either copy operations, then the DB file server 208 sends a database command to database server 105 to roll back to the savepoint associated with the last transaction on the transaction list. In the present example, TX4 is the last entry in the list. Therefore, in response to a failure, DB file server 208 would send database server 105 a command to "roll back" to the savepoint associated with TX4. After rolling back, the entry for TX4 would be removed from the tail of the transaction list.

Double Nested Transactions TX5, TX6 and TX7

If the copying of Folder F11 and Document D111 is successful, then DB file server 208 adds an entry for another transaction TX5 to the tail of the transaction list, and sends database server 105 a savepoint command for transaction TX5. At this point, the transaction list contains: TX1, TX4, TX5.

The DB file server 208 then sends commands to database server 105 to send email to the owner of D111 and send email to the administrator. If a failure occurs during the transmission of either message, then the DB file server 208 sends a database command to database server 105 to roll back to the savepoint associated with the last transaction on the transaction list. In the present example, TX5 is the last entry in the list. Therefore, in response to a failure, DB file server 208 would send database server 105 a command to "roll back" to the savepoint associated with TX5.

After rolling back, DB file server 108 removes the entry at the tail of the transaction list. In the present case, DB file server 108 removes the entry for TX5. If the transmission of the email messages is successful, then no rollback is performed, and the entry for TX5 is removed from the tail of the transaction list. At this point, the transaction list contains: TX1, TX4.

The DB file server 208 then sends database server 105 the command to copy Document D112. If a failure occurs, then the DB file server 208 sends a database command to database server 105 to roll back to the savepoint associated with the last transaction on the transaction list. In the present example, TX4 is the last entry in the list. Therefore, in response to a failure, DB file server 208 would send database server 105 a command to "roll back" to the savepoint associated with TX4. After rolling back, the entry for TX4 would be removed from the tail of the transaction list.

If the copying of Document D112 is successful, then DB file server 208 adds an entry for another transaction TX6 to the tail of the transaction list, and sends database server 105 a savepoint command for transaction TX6. At this point, the transaction list contains: TX1, TX4, TX6.

The DB file server 208 then sends commands to database server 105 to send email to the owner of D112 and send email to the administrator. If a failure occurs during the transmission of either message, then the DB file server 208 sends a database command to database server 105 to roll back to the savepoint associated with the last transaction on the transaction list. In the present example, TX6 is the last entry in the list. Therefore, in response to a failure, DB file server 208 would send database server 105 a command to "roll back" to the savepoint associated with TX6.

After rolling back, DB file server 108 removes the entry at the tail of the transaction list. In the present case, DB file server 108 removes the entry for TX6. If the transmission of the email messages is successful, then no rollback is performed, and the entry for TX6 is removed from the tail of the transaction list. At this point, the transaction list contains: TX1, TX4.

DB file server 208 adds an entry for another transaction TX7 to the tail of the transaction list, and sends database server 105 a savepoint command for transaction TX7. At this point, the transaction list contains: TX1, TX4, TX7.

The DB file server 208 then sends database server 105 commands to copy Folder F111 and Document D1111. If a failure occurs, then the DB file server 208 sends a database command to database server 105 to roll back to the savepoint associated with the last transaction on the transaction list. In the present example, TX7 is the last entry in the list. Therefore, in response to a failure, DB file server 208 would send database server 105 a command to "roll back" to the savepoint associated with TX7. After rolling back, the entry for TX7 would be removed from the tail of the transaction list.

Triple Nested Transaction TX8

If the copying of Folder F111 and Document D1111 is successful, then DB file server 208 adds an entry for another transaction TX8 to the tail of the transaction list, and sends database server 105 a savepoint command for transaction TX8. At this point, the transaction list contains: TX1, TX4, TX7, TX8.

The DB file server 208 then sends commands to database server 105 to send email to the owner of D1111 and send email to the administrator. If a failure occurs during the transmission of either message, then the DB file server 208 sends a database command to database server 105 to roll back to the savepoint associated with the last transaction on the transaction list. In the present example, TX8 is the last entry in the list. Therefore, in response to a failure, DB file server 208 would send database server 105 a command to "roll back" to the savepoint associated with TX8.

After rolling back, DB file server 108 removes the entry at the tail of the transaction list. In the present case, DB file server 108 removes the entry for TX8. If the transmission of the email messages is successful, then no rollback is performed, and the entry for TX8 is removed from the tail of the transaction list. At this point, the transaction list contains: TX1, TX4, TX7.

At this point, all of the operations in transaction TX7 have been performed, so the entry for TX7 is removed from the transaction list. Similarly, all of the operations in transaction TX4 have been performed, so the entry for TX4 is removed from the transaction list. After the removal of these two entries, the transaction list contains: TX1.

Copying Folders F12 and F13

The DB file server 208 then sends database server 105 a command to create a savepoint for transaction TX9, and adds an entry for TX9 to the transaction list. At this point, the transaction list contains: TX1, TX9.

The DB file server 208 then sends database server 105 commands to copy Folder F12 and Document D121. If a failure occurs, then the DB file server 208 sends a database command to database server 105 to roll back to the savepoint associated with the last transaction on the transaction list. In the present example, TX9 is the last entry in the list. Therefore, in response to a failure, DB file server 208 would send database server 105 a command to "roll back" to the savepoint associated with TX9. After rolling back, the entry for TX9 would be removed from the tail of the transaction list.

If the copying of Folder F12 and Document D121 is successful, then DB file server 208 adds an entry for another transaction TX10 to the tail of the transaction list, and sends database server 105 a savepoint command for transaction TX10. At this point, the transaction list contains: TX1, TX9, TX10.

The DB file server 208 then sends commands to database server 105 to send email to the owner of D121 and send email to the administrator. If a failure occurs during the transmission of either message, then the DB file server 208 sends a database command to database server 105 to roll back to the savepoint associated with the last transaction on the transaction list. In the present example, TX10 is the last entry in the list. Therefore, in response to a failure, DB file server 208 would send database server 105 a command to "roll back" to the savepoint associated with TX10.

After rolling back, DB file server 108 removes the entry at the tail of the transaction list. In the present case, DB file server 108 removes the entry for TX10. If the transmission of the email messages is successful, then no rollback is performed, and the entry for TX10 is removed from the tail of the transaction list. At this point, the transaction list contains: TX1, TX9.

The DB file server 208 then sends database server 105 commands to copy Document D122. If a failure occurs, then the DB file server 208 sends a database command to database server 105 to roll back to the savepoint associated with the last transaction on the transaction list. In the present example, TX9 is the last entry in the list. Therefore, in response to a failure, DB file server 208 would send database server 105 a command to "roll back" to the savepoint associated with TX9. After rolling back, the entry for TX9 would be removed from the tail of the transaction list.

If the copying of Document D122 is successful, then DB file server 208 adds an entry for another transaction TX11 to the tail of the transaction list, and sends database server 105 a savepoint command for transaction TX11. At this point, the transaction list contains: TX1, TX9, TX11.

The DB file server 208 then sends commands to database server 105 to send email to the owner of D122 and send email to the administrator. If a failure occurs during the transmission of either message, then the DB file server 208 sends a database command to database server 105 to roll back to the savepoint associated with the last transaction on the transaction list. In the present example, TX11 is the last entry in the list. Therefore, in response to a failure, DB file server 208 would send database server 105 a command to "roll back" to the savepoint associated with TX11.

After rolling back, DB file server 108 removes the entry at the tail of the transaction list. In the present case, DB file server 108 removes the entry for TX11. If the transmission of the email messages is successful, then no rollback is performed, and the entry for TX11 is removed from the tail of the transaction list. At this point, the transaction list contains: TX1, TX9. All of the operations associated with copying Folder F12 have been completed, so the entry for transaction TX9 is removed from the transaction list. The transaction list then contains: TX1.

The DB file server 208 then sends database server 105 a command to create a savepoint for transaction TX12, and adds an entry for TX12 to the transaction list. At this point, the transaction list contains: TX1, TX12.

The DB file server 208 then sends database server 105 commands to copy Folder F13 and Document D131. If a failure occurs, then the DB file server 208 sends a database command to database server 105 to roll back to the savepoint associated with the last transaction on the transaction list. In the present example, TX12 is the last entry in the list. Therefore, in response to a failure, DB file server 208 would send database server 105 a command to "roll back" to the savepoint associated with TX12. After rolling back, the entry for TX12 would be removed from the tail of the transaction list.

If the copying of Folder F13 and Document D131 is successful, then DB file server 208 adds an entry for another transaction TX13 to the tail of the transaction list, and sends database server 105 a savepoint command for transaction TX13. At this point, the transaction list contains: TX1, TX12, TX13.

The DB file server 208 then sends commands to database server 105 to send email to the owner of D131 and to send email to the administrator. If a failure occurs during the transmission of either message, then the DB file server 208 sends a database command to database server 105 to roll back to the savepoint associated with the last transaction on the transaction list. In the present example, TX13 is the last entry in the list. Therefore, in response to a failure, DB file server 208 would send database server 105 a command to "roll back" to the savepoint associated with TX13.

After rolling back, DB file server 108 removes the entry at the tail of the transaction list. In the present case, DB file server 108 removes the entry for TX13. If the transmission of the email messages is successful, then no rollback is performed, and the entry for TX13 is removed from the tail of the transaction list. At this point, the transaction list contains: TX1, TX12.

The DB file server 208 then sends database server 105 commands to copy Document D132. If a failure occurs, then the DB file server 208 sends a database command to database server 105 to roll back to the savepoint associated with the last transaction on the transaction list. In the present example, TX12 is the last entry in the list. Therefore, in response to a failure, DB file server 208 would send database server 105 a command to "roll back" to the savepoint associated with TX12. After rolling back, the entry for TX12 would be removed from the tail of the transaction list.

If the copying of Document D132 is successful, then DB file server 208 adds an entry for another transaction TX14 to the tail of the transaction list, and sends database server 105 a savepoint command for transaction TX14. At this point, the transaction list contains: TX1, TX12, TX14.

The DB file server 208 then sends commands to database server 105 to send email to the owner of D132 and send email to the administrator. If a failure occurs during the transmission of either message, then the DB file server 208 sends a database command to database server 105 to roll back to the savepoint associated with the last transaction on the transaction list. In the present example, TX14 is the last entry in the list. Therefore, in response to a failure, DB file server 208 would send database server 105 a command to "roll back" to the savepoint associated with TX14.

After rolling back, DB file server 108 removes the entry at the tail of the transaction list. In the present case, DB file server 108 removes the entry for TX14. If the transmission of the email messages is successful, then no rollback is performed, and the entry for TX14 is removed from the tail of the transaction list. At this point, the transaction list contains: TX1, TX12.

The DB file server 208 then sends database server 105 commands to copy Document D133. If a failure occurs, then the DB file server 208 sends a database command to database server 105 to roll back to the savepoint associated with the last transaction on the transaction list. In the present example, TX12 is the last entry in the list. Therefore, in response to a failure, DB file server 208 would send database server 105 a command to "roll back" to the savepoint associated with TX12. After rolling back, the entry for TX12 would be removed from the tail of the transaction list.

If the copying of Document D133 is successful, then DB file server 208 adds an entry for another transaction TX15 to the tail of the transaction list, and sends database server 105 a savepoint command for transaction TX15. At this point, the transaction list contains: TX1, TX12, TX15.

The DB file server 208 then sends commands to database server 105 to send email to the owner of D133 and send email to the administrator. If a failure occurs during the transmission of either message, then the DB file server 208 sends a database command to database server 105 to roll back to the savepoint associated with the last transaction on the transaction list. In the present example, TX15 is the last entry in the list. Therefore, in response to a failure, DB file server 208 would send database server 105 a command to "roll back" to the savepoint associated with TX15.

After rolling back, DB file server 108 removes the entry at the tail of the transaction list. In the present case, DB file server 108 removes the entry for TX15. If the transmission of the email messages is successful, then no rollback is performed, and the entry for TX15 is removed from the tail of the transaction list. At this point, the transaction list contains: TX1, TX12.

At this point, the operations associated with TX12 have been completed, so the entry for TX12 is removed from the transaction list. Similarly, all of the operations for the outermost transaction TX1 have been completed, so the entry for TX1 is removed from the list. In response to completing the operations for the outermost transaction, DB file server 108 sends a "commit transaction" command to database server 105. In response to the commit transaction command, the database server 105 commits to the database the changes made by all of the operations except those that belonged to nested transactions that were rolled back.

Triggered Operations in a File System

In the example given above, the hierarchical relationship between the operations that were performed generally corresponds to the hierarchical organization of the folders and documents on which the operations were performed. For example, folder F11 resides in folder F1, and the operations involving the documents contained in F11 are performed as a transaction that is nested in a transaction for performing the operations involving the documents contained in folder F1.

However, in a file system that allows functionality to be attached to or triggered by file operations, the nesting of transactions for performing the operations may not correspond to hierarchical relationships between files. Rather, the nesting of transactions for performing the operations may be dictated by which operations triggered which other operations.

For example, a system that allows functionality to be attached to or triggered by file system operations is described in U.S. patent application Ser. No. 09/571,036, entitled "Event Notification System Tied to File System", filed on May 15, 2000 by Eric Sedlar, the entire contents of which are incorporated herein by this reference. In such a system, a user may configure the file system with the following functionality:

(1) Deleting a particular type of file triggers the backup of the file and triggers email messages to be broadcast to all administrators.

(2) Receiving email in a particular administrator account triggers the forwarding of the email to several related email accounts.

(3) The deletion of the file should fail if the backup operation fails.

(4) The deletion of the file should proceed even if the email transmissions fail.

(5) No administrator should get email if all administrators do not get email.

In this example, the act of deleting a single file could trigger operations performed as follows:
Start transaction TX1
Delete File
Backup File
Start transaction TX2
Send message to Admin1
Send message to Admin 2
Send message to Admin 3
   Start transaction TX3
   Forward message to Admin 3-1
   Forward message to Admin 3-2
   End transaction TX3
End transaction TX2
End transaction TX1

In systems that allow functionality to be triggered by a file system operation, different parties may be responsible for developing the different modules for performing the functionality. For example, a first party may develop the module for causing email that arrives at one email account to be forwarded to other email accounts. An entirely different party may develop the module that causes deleted files to be sent to a backup location. Yet another party may develop the module for sending email to all administrators when a certain type of file is deleted.

Because the operations within a module are executed as a nested transaction, the party designing the module does not have to take into account the potentially complex context in which the operations may be performed. Specifically, when executed as a nested transaction, the operations specified by a module will execute in an all-or-nothing matter (1) whether or not the execution of the operations is triggered by an operation in an outer transaction, and (2) whether or not any of the operations in the module trigger execution of other, nested transactions.

In the preceding examples, outer transactions continue to be performed when transactions nested within them fail. However, this need not always be the case. The logic of the outer transaction dictates how the outer transaction responds to failure of a nested transaction. In some cases, it may be desirable for the outer transaction logic to specify that the outer transaction fails if a particular nested transaction fails. Thus, when operations are performed in a nested transaction, their failure may cause the outer transaction to fail if that behavior is dictated by the logic of the outer transaction. However, by virtue of the fact that the operations are performed as part of a nested transaction, their failure, in the absence of specific logic to the contrary, does not necessarily and automatically cause the operations in the outer transaction to fail.

Optimizations

When the techniques described herein are used in a system where the entity that receives file system commands (e.g. DB file server 208) is separate from the database in which the files are stored, various mechanisms may be employed to improve performance. For example, DB file server 208 may maintain a cache of file system metadata for recently accessed files. By caching such information in DB file server 208, DB file server 208 need not issue a database command to database server 105 every time such information is required. Other types of file system data that may be cached within DB file server 208 includes, but is not limited to, data that indicates the access permissions associated with files, and data that indicates the pathnames to files. Because the file system operations are being performed as part of transactions, the DB file server 208 employs caching techniques that determine what cached data can be provided to operations based on the state of the transaction to which the operations belong.

Another optimization involves distinguishing between "read only" transactions and transactions that make changes. If none of the operations in a transaction make any changes to the database, then the transaction is a "read only" transaction. According to one embodiment, DB file system 208 is configured to determine whether a transaction is a read only transaction, and to only send a "savepoint" command to database server 105 when beginning transactions that are not read only transactions. A savepoint need not be established for read only transactions because they make no changes to the database. Because no changes are made, no changes have to be rolled back if the read only transaction fails.

Hardware Overview

Figure 4:
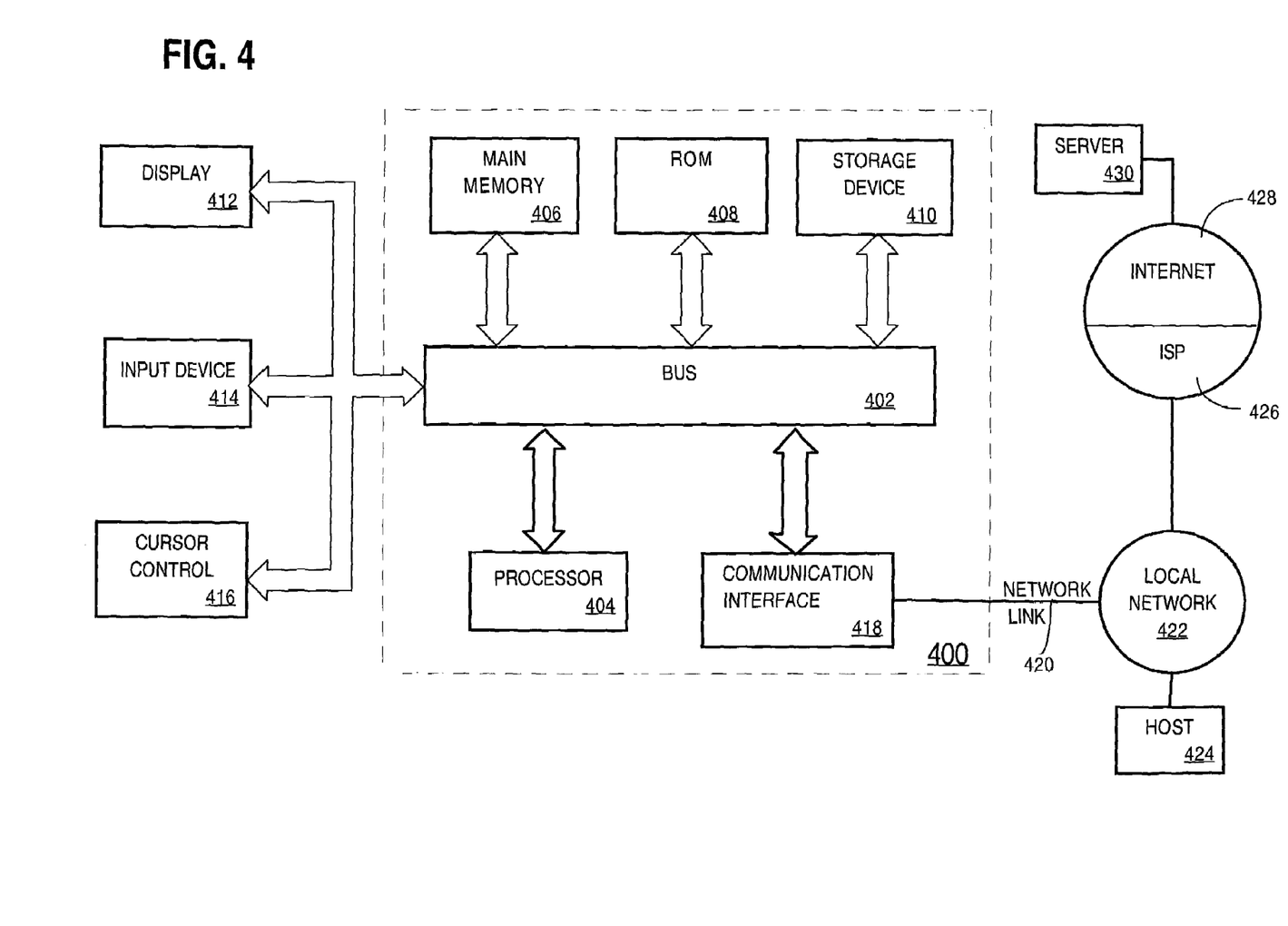
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing operations in an electronic file system, the method comprising the steps of:
   receiving a command to perform one or more file system operations, wherein said command expressly identifies said one or more file system operations;
   in response to said command, translating a plurality of operations including said one or more file system operations into database commands; and
   a database server executing said database commands, wherein the step of executing includes:
      performing a first subset of said database commands that corresponds to a first subset of said plurality of operations as part of a first transaction; and
      performing a second subset of said database commands that corresponds to a second subset of said plurality of operations as part of a second transaction that is nested in said first transaction,
      wherein each of said one or more file system operations is included in one of the first subset of said plurality of operations and the second subset of said plurality of operations.

2. The method of claim 1 wherein the step of executing further includes the step of performing a third subset of said database commands that corresponds to a third subset of said plurality of operations as part of a third transaction that is nested in said second transaction.

3. The method of claim 1 wherein the second subset of operations are operations that are triggered by an operation that belongs to said first subset of operations.

4. The method of claim 3 wherein:
   the one or more file system operations include an operation on a folder; and
   the second subset of operations includes operations associated with one or more documents within the folder.

5. The method of claim 1 wherein:
   the step of receiving the command is performed by an entity that resides external to said database server; and
   the method further comprises said entity sending said database commands to said database server.

6. The method of claim 5 wherein the step of performing said second subset includes:
   the entity sending to the database server a savepoint command for the database server to establish a savepoint; and
   after the entity sends to the database server a savepoint command, the entity sending to the database server said second subset of said database commands for performing said second subset of said plurality of operations.

7. The method of claim 6 further comprising the entity responding to a failure of an operation in said second subset of said plurality of operations by sending to the database server a command to roll back to said savepoint.

8. The method of claim 5 further comprising the entity maintaining a transaction list by performing the steps of:
   adding an entry to the tail of the transaction list when the entity sends a savepoint command to the database server to start a nested transaction; and
   when an operation fails, determining the savepoint to roll back to based on the entry at the tail of the transaction list; and
   removing the entry from the tail of the transaction list when the nested transaction fails or completes successfully.

9. The method of claim 5 further comprising the steps of:
   the entity determining whether all operations that are to be performed as a nested transaction are read only;
   if all operations that are to be performed as the nested transaction are read only, then sending commands to perform the operations without first sending a command to establish a savepoint; and
   if all operations that are to be performed as the nested transaction are not read only, then sending a command to establish a savepoint prior to sending commands to perform the operations.

10. The method of claim 1 wherein said one or more file system operations include one of an operation for copying a file and an operation for copying a folder.

11. A computer-readable medium carrying instructions for performing operations in an electronic file system, the computer-readable medium comprising instructions for performing the steps of:
   receiving a command to perform one or more file system operations, wherein said command expressly identifies said one or more file system operations;
   in response to said command, translating a plurality of operations including said one or more file system operations into database commands; and
   a database server executing said database commands, wherein the step of executing includes:
      performing a first subset of said database commands that corresponds to a first subset of said plurality of operations as part of a first transaction; and
      performing a second subset of said database commands that corresponds to a second subset of said plurality of operations as part of a second transaction that is nested in said first transaction,
      wherein each of said one or more file system operations is included in at least one of the first subset of said plurality of operations and the second subset of said plurality of operations.

12. The computer-readable medium of claim 11 wherein the step of executing further includes the step of performing a third subset of said database commands that corresponds to a third subset of said plurality of operations as part of a third transaction that is nested in said second transaction.

13. The computer-readable medium of claim 11 wherein the second subset of operations are operations that are triggered by an operation that belongs to said first subset of operations.

14. The computer-readable medium of claim 13 wherein:
   the one or more file system operations include an operation on a folder; and
   the second subset of operations includes operations associated with one or more documents within the folder.

15. The computer-readable medium of claim 11 wherein:
the step of receiving the command is performed by an entity that resides external to said database server; and
the computer-readable medium further comprises instructions for performing the step of said entity sending said database commands to said database server.

16. The computer-readable medium of claim 15 wherein the step of performing said second subset includes:
the entity sending to the database server a savepoint command for the database server to establish a savepoint; and
after the entity sends to the database server a savepoint command, the entity sending to the database server said second subset of said database commands for performing said second subset of said plurality of operations.

17. The computer-readable medium of claim 16 wherein the entity responds to a failure of an operation in said second subset of said plurality of operations by sending to the database server a command to roll back to said savepoint.

18. The computer-readable medium of claim 15 further comprising instructions for causing the entity to maintain a transaction list by performing the steps of:
adding an entry to the tail of the transaction list when the entity sends a savepoint command to the database server to start a nested transaction; and
when an operation fails, determining the savepoint to roll back to based on the entry at the tail of the transaction list; and
removing the entry from the tail of the transaction list when the nested transaction fails or completes successfully.

19. The computer-readable medium of claim 15 further comprising instructions for performing the steps of:
the entity determining whether all operations that are to be performed as a nested transaction are read only;
if all operations that are to be performed as the nested transaction are read only, then sending commands to perform the operations without first sending a command to establish a savepoint; and
if all operations that are to be performed as the nested transaction are not read only, then sending a command to establish a savepoint prior to sending commands to perform the operations.

20. The computer-readable medium of claim 11 wherein said one or more file system operations include one of an operation for copying a file and an operation for copying a folder.

\* \* \* \* \*